United States Patent
Brueckheimer et al.

(10) Patent No.: US 6,574,223 B1
(45) Date of Patent: Jun. 3, 2003

(54) ADAPTION LAYER SWITCHING

(75) Inventors: Simon Daniel Brueckheimer, London (GB); David John Stacey, Stanstead Abbotts (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/341,584
(22) PCT Filed: Feb. 19, 1998
(86) PCT No.: PCT/GB98/00519
§ 371 (c)(1),
(2), (4) Date: Jul. 13, 1999
(87) PCT Pub. No.: WO98/37728
PCT Pub. Date: Aug. 27, 1998

(30) Foreign Application Priority Data

Feb. 21, 1997 (GB) .............................................. 9703674

(51) Int. Cl.[7] .............................................. H04Q 11/04
(52) U.S. Cl. .................................................. 370/395.6
(58) Field of Search ................................ 370/349, 389, 370/392, 395.21, 395.43, 395.42, 395.51, 395.6, 395.61, 395.63, 395.64, 395.65, 468, 469, 471, 473, 474, 476, 537, 538

(56) References Cited

U.S. PATENT DOCUMENTS

| | | | | |
|---|---|---|---|---|
| 5,509,007 A | | 4/1996 | Takashima et al. | 370/60.1 |
| 5,570,362 A | * | 10/1996 | Nishimura | 370/395.1 |
| 5,774,469 A | * | 6/1998 | Wirkestrand | 370/473 |
| 5,802,051 A | * | 9/1998 | Petersen et al. | 370/395.42 |
| 5,822,321 A | * | 10/1998 | Petersen et al. | 370/471 |
| 5,978,375 A | * | 11/1999 | Petersen et al. | 370/395.6 |
| 6,041,054 A | * | 3/2000 | Westberg | 370/389 |
| 6,331,981 B1 | * | 12/2001 | Harth et al. | 370/395.1 |
| 6,341,131 B1 | * | 1/2002 | Eneroth et al. | 370/395.61 |

FOREIGN PATENT DOCUMENTS

| | | | | |
|---|---|---|---|---|
| GB | 2322515 | * | 2/1997 | H04Q/11/04 |
| WO | WO 95/34977 | * | 12/1995 | H04L/12/56 |

OTHER PUBLICATIONS

Kure, "An ATM Network Interface For An SCI–Based System", Proceedings of the IFIP, 4/18–21/94, pp. 203–215.

* cited by examiner

Primary Examiner—Melvin Marcelo
Assistant Examiner—Derrick W. Ferris
(74) Attorney, Agent, or Firm—Barnes & Thornburg

(57) ABSTRACT

In an adaptation layer switching network, functional partitioning is provided by providing a separation between service specific sublayers (SSCS), common part sublayers (CPS) and transport convergence. This enables the support of a range of SSCS functions via common set of CPS blocks.

8 Claims, 17 Drawing Sheets

ADAPTION LAYER SWITCHING

This invention relates to digital communications systems and in particular to systems embodying asyncnronous transfer mode (ATM) technology.

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL).

A recent development has been the introduction of the AAL-2 adaptation layer. This adaptation layer has been optimised to accommodate the demands of low bit-rate communications representing the increasing trend to greater voice compression. The adaptation layer is a multiplex of users in a single ATM connection where each user's information is carried in short packets or minicells each with a header identifying the user channel and incorporating ancillary control information. This constitutes a dynamic trunk group of users in a single connection.

As telecommunications networks increase in complexity and carry increasing volumes of traffic, the current procedures for setting up connections between subscribers are limiting the performance of these networks. In particular, congestion may be caused by attempting to connect to a subscriber who is already busy, or by attempting to choose a route through an already congested part of the network. Thus equipment and resources can be wasted in attempts to set up calls which cannot be completed. A further problem is that of scalability. As the network expands to accommodate increased traffic and a larger number of subscribers, there is an increasing need to facilitate integration of new equipment into an existing network without simply increasing the congestion problem. Moreover, careful planning is required to ensure that calls can be routed through the network. This requires an ad-hoc distributed routing decision policy which limits the flexibility of the routing process as the call routing must be co-located with the switching node fabric.

An adaptation layer switching network is described by O. Kure et al. in Proceedings of the IFIP TC6 International Conference on Information Networks and Data Communication, Funchal, Madeira Island, Portugal, Apr. 18–21 1994. A method of switching synchronous transfer mode cells in a circuit emulated ATM switch using a layered protocol model is described in specification No. WO95/34977.

Reference is here directed to our co-pending application (Reference S D Brueckheimer 19) of even date and which relates to the application of PNNI signalling to control an ATM adaptation layer switching network.

SUMMARY OF THE INVENTION

According to one aspect of the invention there is provided an adaptation layer switching network in which functional partitioning provides a separation between service specific sublayers (SSCS), common part sublayers (CPS) and transport convergence whereby to support a range of SSCS functions via a common set CPS blocks.

According to another aspect of the invention there is provided method of functional partitioning of an adaptation layer switching network by providing a separation between service specific sublayers (SSCS), common part sublayers (CPS) and transport convergence whereby to support a range of SSCS functions via a common set CPS blocks.

According to a further aspect of the invention there is provided a telecommunications network comprising edge device nodes and adaptation layer switching nodes, wherein the edge nodes terminate the adaptation layer switching nodes to service access points, and wherein the adaptation layer switching nodes provide minicell switching points within the network.

The network architecture for adaptation layer switching is derived from AAL-2 technology. An adaptation layer switching network provides the capability to deliver a fully scalable network and nodal solutions that can utilise existing ATM infrastructure for transport. The use of AAL-2 technology and adaptation layer switching provides a network infrastructure suitable for carrying all delay sensitive and real-time services with a GoS (grade of service) that meets ITU standards for delay and distortion. The network can be constructed from two basic building blocks. These comprise edge devices and adaptation layer switches.

The arrangement and method exploit the ATM adaptation layer (AAL-2) to configure networks and switching functions. In particular, the AAL-2 adaptation switching function is employed to provide the ability to establish and control an AAL-2 minicell connection across many nodes thus forming an adaptation layer switching network. The network can readily be scaled to global proportions.

The arrangement and method also provide a functional partitioning of AAL-2 to realise the necessary functions for a switching network. These functions include a service specific convergence function (SSCF) and a minicell switching/relay function. The partitioning achieves a clear separation between the SSCS, CPS and transmission convergence (TC) sublayers, and enables a common CPS to support a multiplicity of SSCS functions and a full range of transmission media.

BRIEF DESCRIPTION OF THE DRAWINGS

An embodiment of the invention will now be described with reference to the accompanying drawings in which.

DESCRIPTION OF PREFERRED EMBODIMENT

Figure 1:
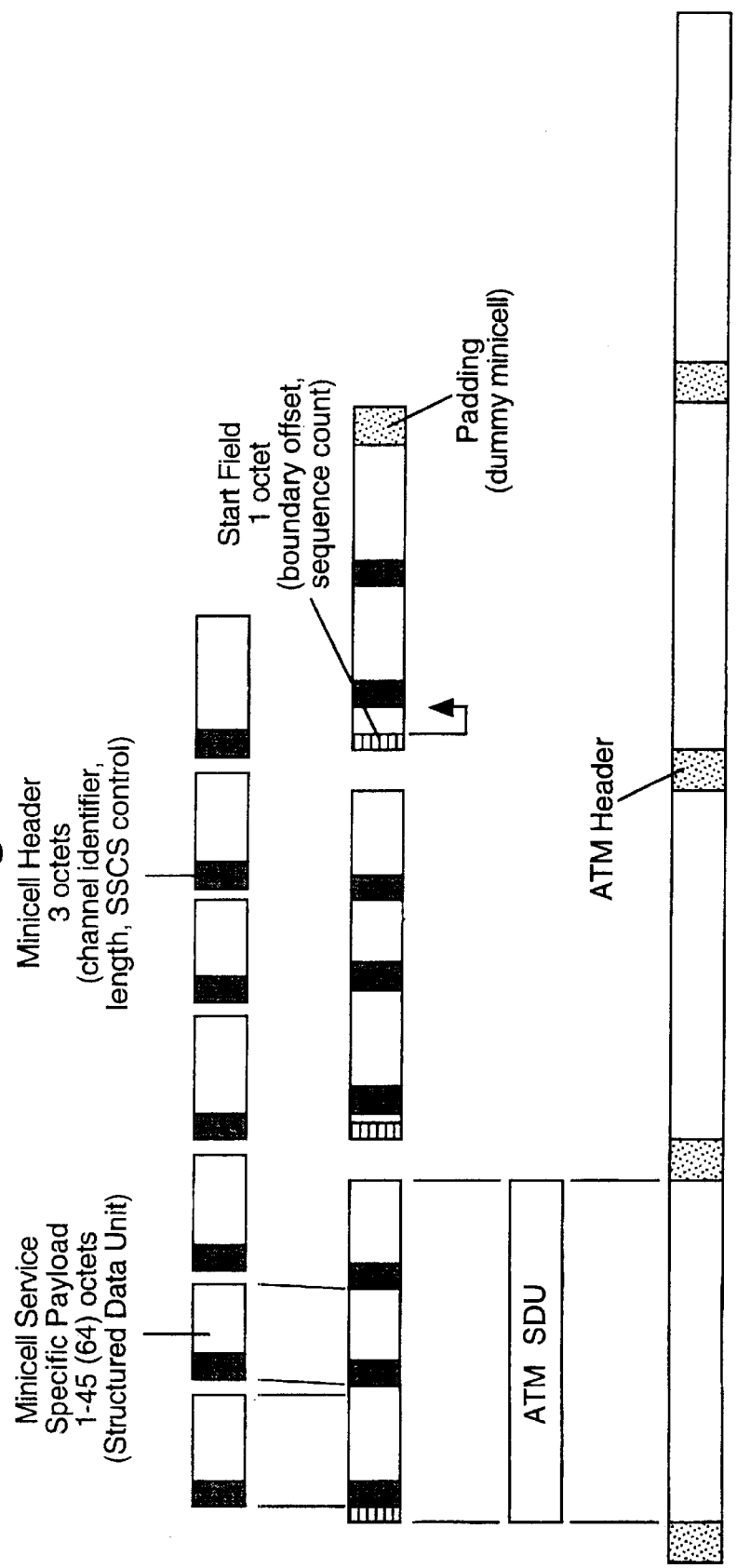
FIG. 1 illustrates the multiplexing of minicells into ATM.

Reference is first made to FIG. 1 which illustrates AAL-2 multiplexing and is introduced for explanatory purposes. The AAL-2 adaptation layer has been optimised to cope with the demands of low bit-rate communications, representing the increasing trend to greater voice compression. The adaptation layer is a multiplex of users in a single ATM connection, where each user's information is carried in a short packet or minicells, with a header identifying the user channel with ancillary control information. This is illustrated schematically in FIG. 1.

By sharing the fixed length payload of the ATM cell between users, the need to compromise by trading cell assembly delay for bandwidth efficiency is avoided thus overcoming a problem which would be acute at low bit-rates and on expensive leased lines. AAL-2 adaptation equipment performs a concentration function to ensure high utilisation, but can also limit the holdover delay of traffic when usage is low.

A further feature of minicells is that they may be of variable size, from 1 to 64 octets, to accommodate a wide variety of applications with minimal overhead. Thus the mapping to ATM cells is asynchronous and in fact quite independent of the length of an ATM cell. The boundary of minicells in the ATM cell payload is signified in every cell by a start field (STF), which specifies the offset, and thus minicells form a self-delineating flow.

The minicell is structured so that services of different types can be supported as Service Specific Convergence Sublayers (SSCS), all carried over the minicell Common Part Sublayer (CPS) identically. The minicell header includes channel identity, length and User-to-User Information (UUI), the latter allows the functions of an SSCS to be specialised according to purpose.

For example four successive samples of ADPCM at 32 kb/s could be packetised into a single mini-cell to provide a packetisation delay of just 1 ms. The octets could form a minicell payload directly, and in this case the SSCS has null functionality. Alternatively, data frames, such as GSM mobile packets, are typically much greater than 64 octets, so a Segmentation and Reassembly (SAR) SSCS function supports such an application. The SAR function can be assisted by using the UUI field between adaptation entities to ensure proper sequenced reassembly of the data packet.

Minicells provide a universal adaptation medium able to support voice, video and data in a common ATM VCC.

The set-up, maintenance and clear-down of minicell channels in an AAL-2 connection, and the switching operation of the relay, is controlled by the AAL-2 Negotiation Procedures (ANP). AAL-2 connections are supported by in-band F7 OAM minicells, replicating for the adaptation layer the connection maintenance capabilities of ATM.

Figure 2:
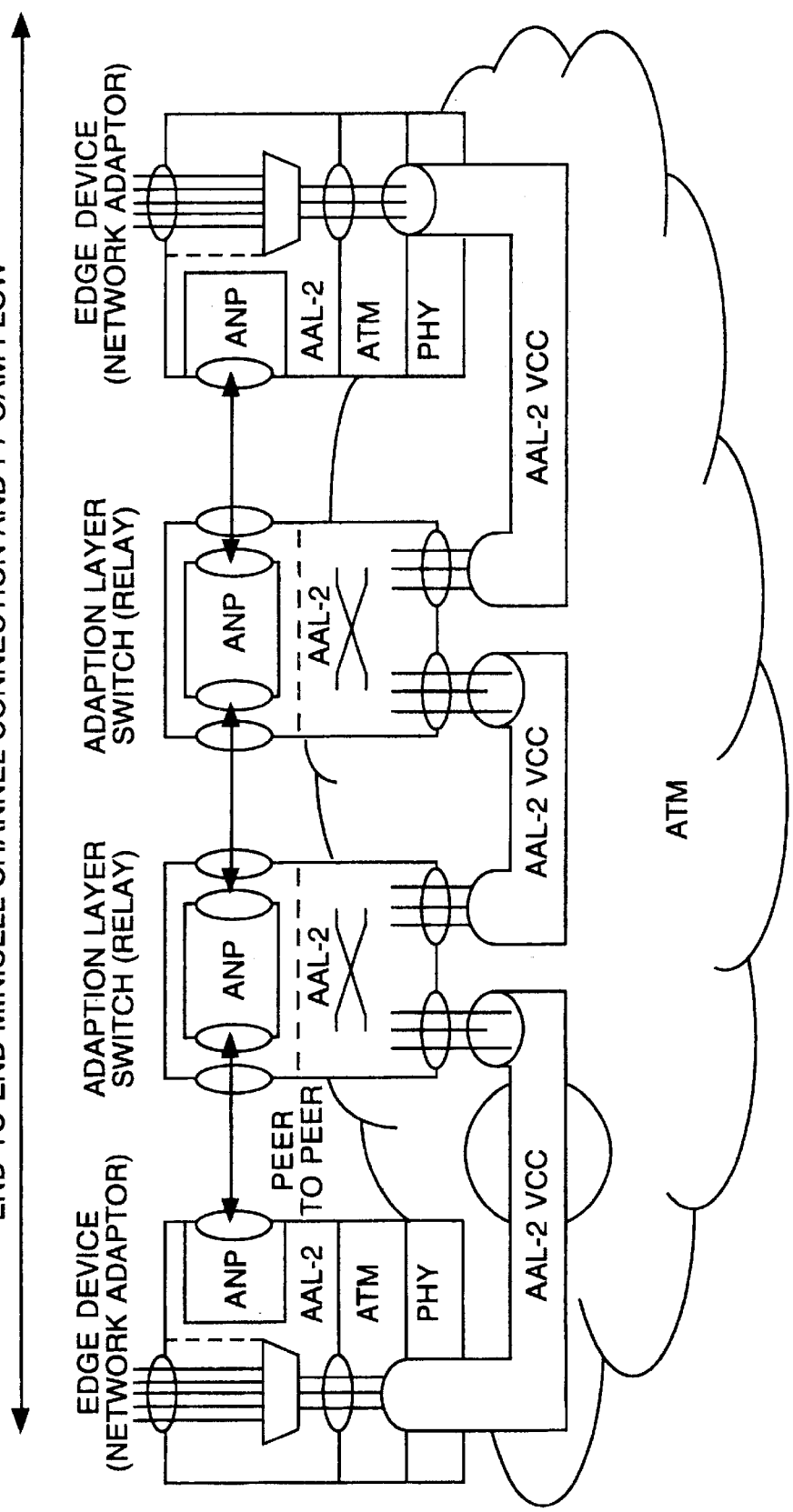
FIG. 2 is a schematic diagram of an ATM network illustrating end to end minicell connection and traffic flow.

The AAL-2 standard specifies a feature that allows minicells to be relayed between connections, without the need to terminate the carried service. This is illustrated in FIG. 2 which illustrates end-to-end AAL-2 connections. The original objective of this capability was to solve a problem in wireless networking, whereby a mobile-to-mobile call is preferably established without transcoding to PCM, to avoid the detriment to quality and cost. The initial connection is established across a single relay or switching centre. However with the mobility of the terminal, the connection may proceed through a succession of hand-overs thereby requiring an end-to-end minicell channel connection through several nodes.

Having once established a minicell switching layer, then it is available to be used for many other applications. We have found that this capability can be exploited to provide the ability to establish and control a minicell channel (adaptation layer) connection across many nodes thus forming an Adaptation Layer Switching network.

AAL-2 Functional Partitioning

This section describes a functional partitioning of AAL-2 technology that enables the service specific convergence function (SSCF)—adaptation of the user service to and from AAL-2 minicells—and a minicell switching functionality to be realised in an efficient and manner. Further this partitioning enables the SSCF and ALS switching functions to share much common technology.

Figure 3:
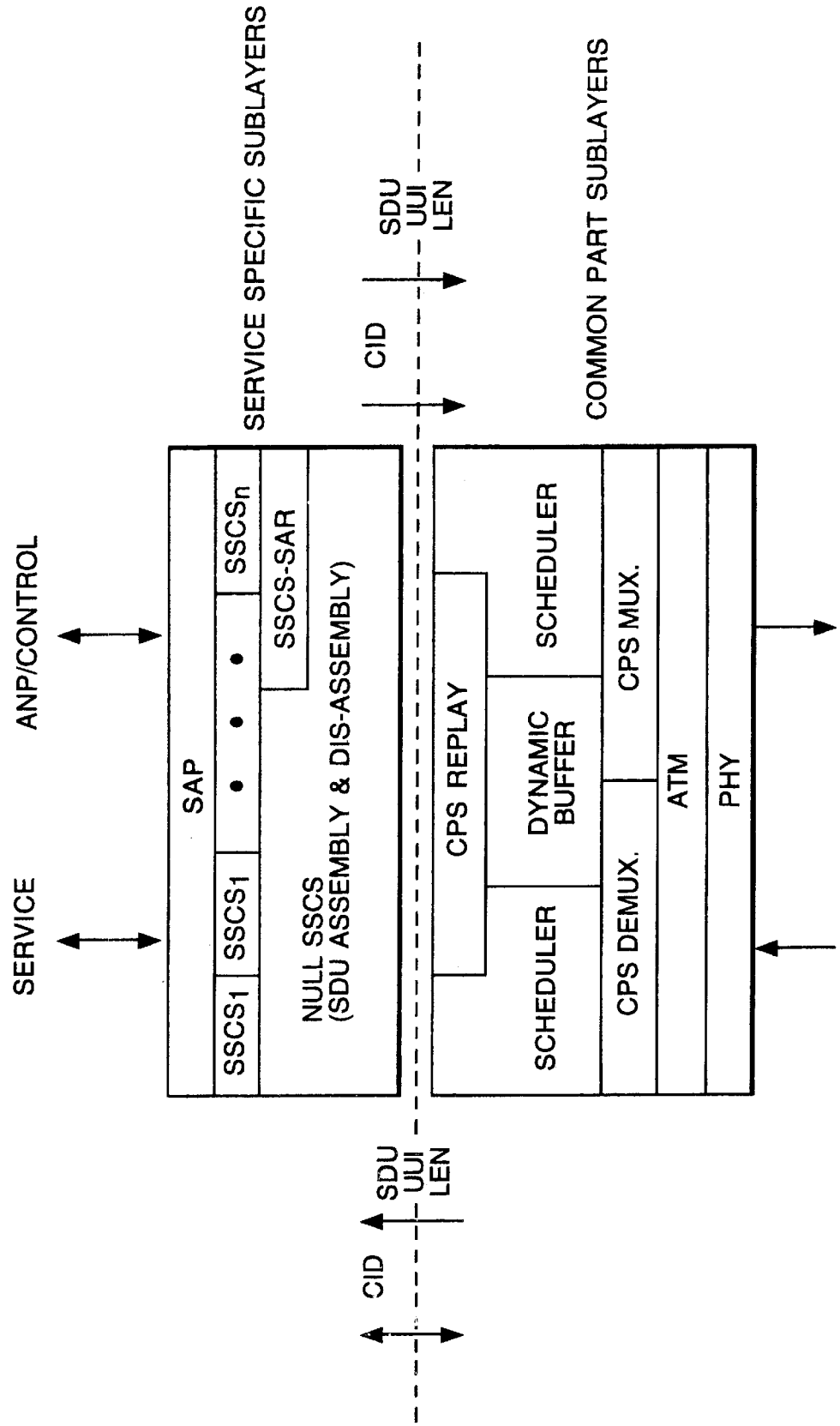
FIG. 3 illustrates AAL-2 functional partitioning to provide a service specific convergence function.
Figure 4:
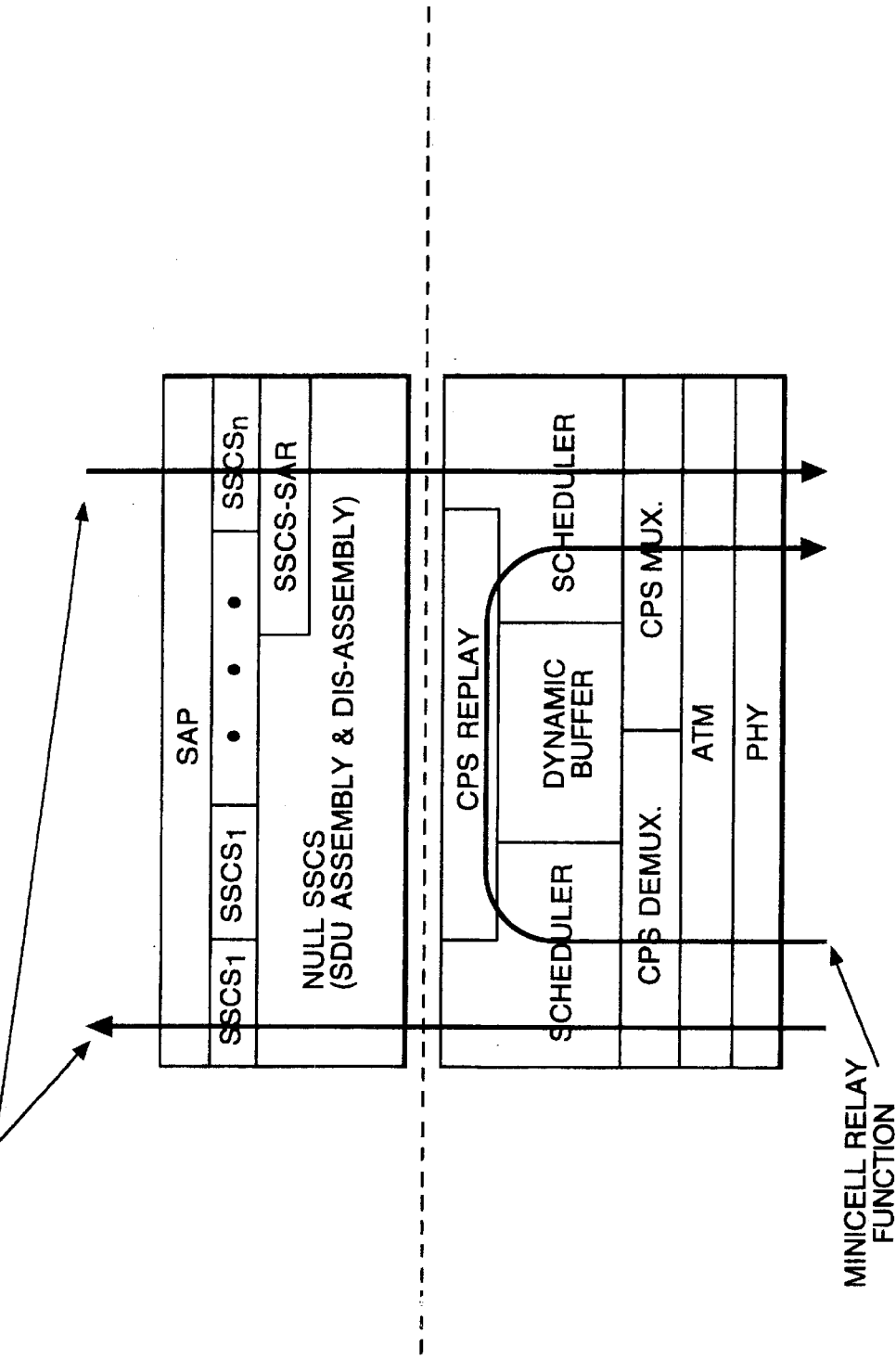
FIG. 4 illustrates data paths through the functional partition of FIG. 3.

FIG. 3 shows the AAL-2 functional partitioning which provides the two key functions required for an adaptation layer switching network: the SSCF and the minicell switching function. The data paths through the functional partition are shown in FIG. 4 which shows the SSCF and ALS functions. We have found that the use of this functional partitioning enables the two functions to share much common technology.

A description of the functional layers is listed below, explaining the key functions of each layer:

PHY LAYER
- the physical interface between the ATM AAL-2 cells and the underlying physical medium, considered to be any suitable physical telecommunications bearer fit for the purpose.

ATM LAYER
- assembly and disassembly of ATM AAL-2 cell payloads (ATM-SDUs or service data units) into ATM cells
- includes the functions of ATM header generation and error protection and detection and translation/substitution of VPNC addresses.

AAL-2 CPS MUX/DEMUX
- assembly and disassembly of AAL-2 minicells into an ATM SDU
    - generation/extraction of the STF field (sequence number, parity and offset) and any other such standardised functions
    - segmentation/reassembly of minicells (minicells can be carried over successive ATM cells)
    - VC/CID translation function
    - minicell multiplexing and demultiplexing function
    - generation/extraction of minicell header CPS information (including minicell header error detection and protection)

DYNAMIC BUFFER/CELL RELAY
- maintains per VC/CID queue of minicells
    - minicells SDUs stored in a slotted shared memory or output queued paradigm
    - per VC/CID queue manager maintained for ingress and egress functions
- minicell scheduling either ingress or egress scheduler can operate in master or slave mode in slave mode ingress scheduler (throughout this paper ingress denotes the side that generates ATM cells) is slaved to an ATM data request function issued by the ATM LAYER—in master mode the ingress scheduler generates ATM data ready instructions to the ATM layer ingress scheduler maintains a per AAL-2 VC holdover delay timer to ensure a maximum CPS multiplex delay and QoS is met—can invoke an automatic payload padding function in slave mode egress scheduler (egress denotes the side that receives ATM cells) is slaved to an SSCS scheduler—in master mode the egress scheduler generates minicell ready commands to the SSCS layers per VC/CID queuing structure enables the ingress and egress schedulers to offer multi-priority AAL-2 connection ability to enable different QoS capabilities minicell relay function switches minicells from the egress to ingress functions in order to accomplish the adaptation layer switching function by making egress queues available to ingress so as to form a common memory switch in the adaptation layer.

Figure 5:
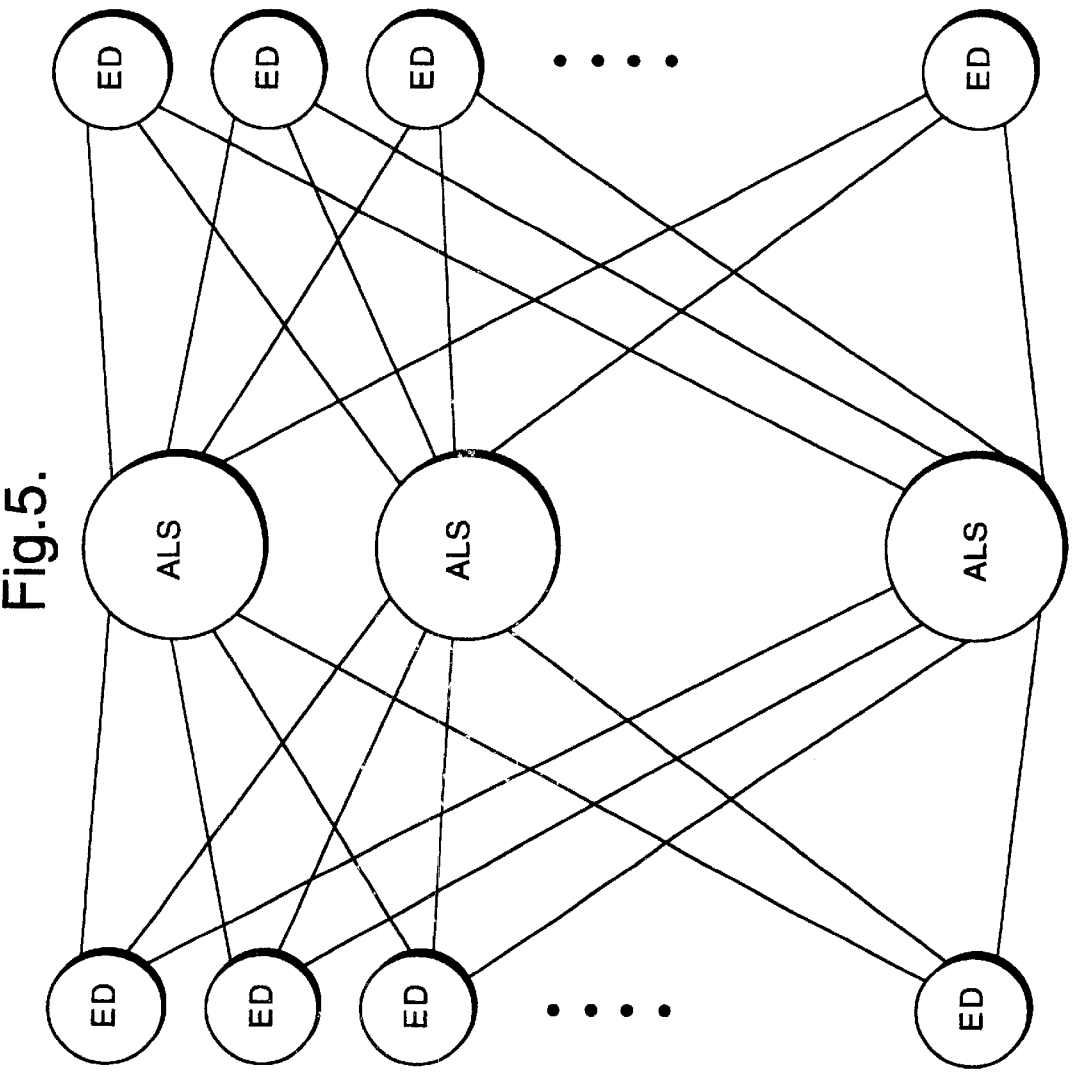
FIG. 5 illustrates the adaptation layer switching (ALS) network architecture.

SSCS Functions assembly and disassembly of minicell data packets in a service specific manner (the service could be TDM, asynchronous packet or synchronous packet based).

generation/extraction of SSCS control information (e.g. UUI bits, length and OAM)

multiplexes/demultiplexes user minicell packets with control (ANP) and management minicell packets in synchronous or asynchronous form an SSCS function can support synchronous (e.g. PCM), semi-synchronous (e.g. ADPCM with speech activity) and asynchronous services (e.g. GSM mobile packet)

several SSCS instances can operate in parallel each tailored to a particular service some common SSCS functions (e.g. segmentation and reassembly—SAR—of long data packets) may be common to several SSCS functions functionality of SSCS is dependent on the service supported but may include functions such as SAR, SAD, error coding and recovery (e.g. use of minicell sequence number and payload error protection), jitter compensation, plesiochronous frame slip/stuff operation, channel concentration, coding rate adaptation (e.g. 64 kb/s to 32 kb/s due to congestion), CDV compensation or any service specific error mitigation functions, or service related function SAP—Service Access Point describes the interface between the SSCS layers and the particular service delivery mechanism ALS Network Architecture In this section we describe the network architectures that can be configured arising from the functional partitioning discussed above. The adaptation layer switching network architecture is shown in FIG. 5. FIG. 5 highlights the adaptation layer nodes. The connectivity is provided by Switched and Permanent VCs (SVC/PVC) in the ATM layer, which has not been shown, but behaves as a virtual connectivity backplane.

As shown schematically in FIG. 5, the network is built using two types of nodes, an Edge Device (ED) node and an Adaptation Layer Switching (ALS) node. The ALS nodes perform a switching function in the adaptation layer and thus route AAL-2 minicells across the network. The minicell switching is performed in the adaptation layer and there is thus no service termination performed in the ALS. Service termination is performed in the ED nodes, the ED providing a service specific convergence function (SSCF) adapting the service to and from AAL-2. Using differing SSCF instances, the ED can simultaneously support many differing service types and the quality of service (QoS) provided to each user can be tailored to that user's service requirements. Thus the adaptation layer switching network forms a full service capable network which can support real time and non-real time services offering a QoS equivalent to current ITU networks.

ED and ALS nodes share much common technology and can both be configured from cascadable, collocated, and commonly controlled and managed physical devices. Large nodes (and hence networks) can be built using cascadable VLSI building blocks and hence an ALS network can scale from a small size to global proportions in a cost effective manner. Using 0.5 micron VLSI technology, ALS nodes that can support the order of a million 64 kb/s circuits and an order of 10s of millions of low-bit-rate voice connections can be built!

Many differing network configurations can be derived using the core ALS technology. Small networks can be configured by inter-connecting EDs to each other directly. The addition of the ALS switching nodes enables the network size to be dramatically scaled. It is possible to configure networks that utilise several stages of ALS (nodal) switching. However the inherent nodal and network scalability of ALS technology also means that it is possible to scale the network to global proportions (hundreds of millions of connections) by using just a via single stage of ALS switching as illustrated in FIG. 3. The simplicity and symmetry of the single-stage switching network shown allows straightforward congestion management using both load-balancing and rejection of blocked traffic at source as per co-pending PNNI case. This yields the highest bandwidth utilisation, from a minimum sufficiency of ALS nodes, to meet any QoS targets on call blocking. The ALS nodes can be designed to be fully non-blocking nodes to improve throughput, and ensure stable behaviour under overload conditions. A fully interconnected ED-to-ALS mesh has been shown in FIG. 3 however it is equally possible to configure networks that use a subset of this connectivity.

Module Partitioning

In this section we describe how ED and ALS nodes can be configured in a modular fashion using simple cascadable building blocks derived from the AAL-2 partitioning described above. The modular building blocks described below all share much common technology.

Figure 6:
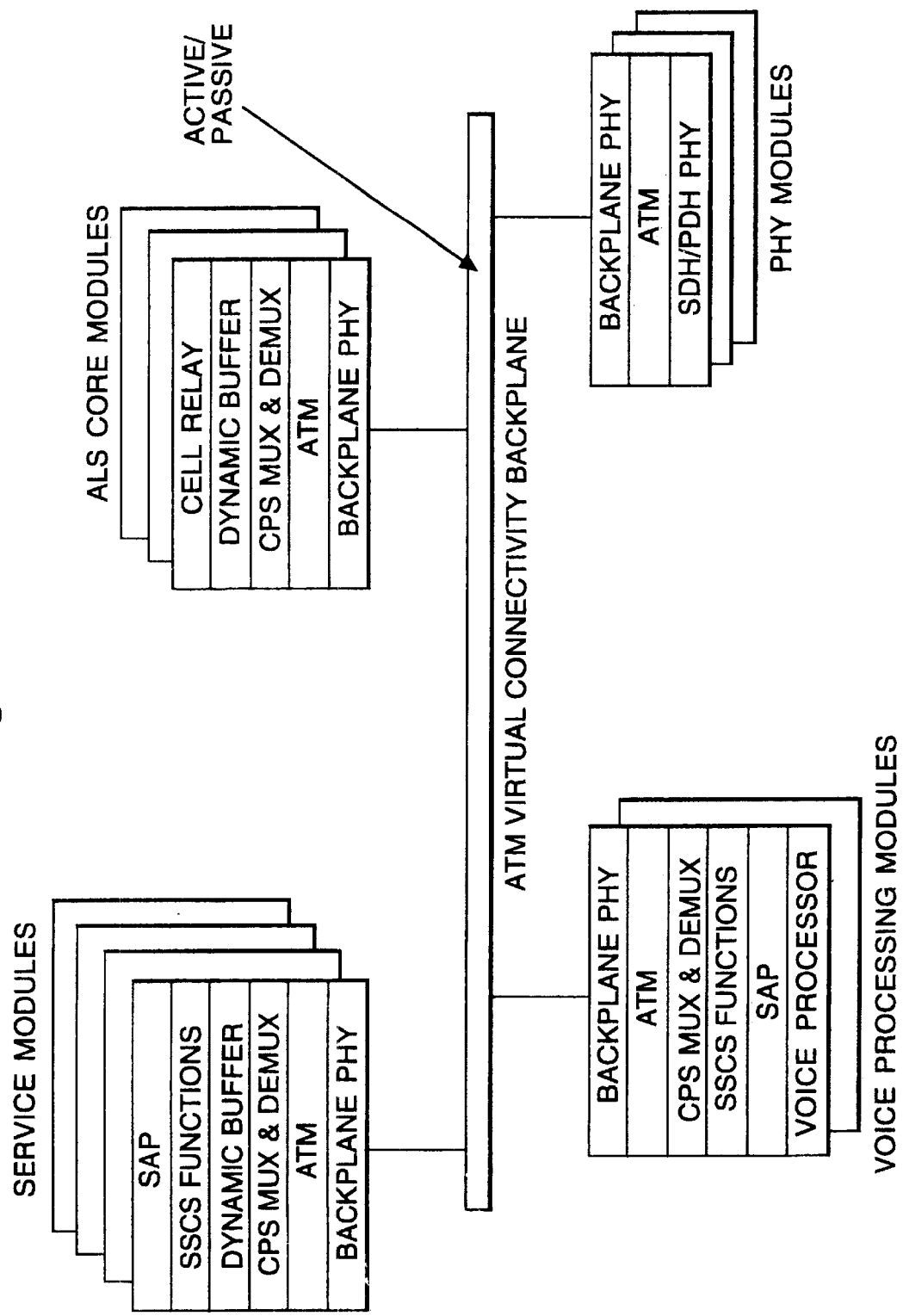
FIG. 6 illustrates the modular partitioning of an edge device.

FIG. 6 shows the a generic modular partitioning of an ED node. It consists of a set of cascadable building blocks—service modules, voice processing modules, ALS core modules and PHY modules. The modules are interconnected using ATM transport. The ATM provides a virtual connectivity backplane which may be an active switch or passive connectivity.

The key building block in an ED node is the service module (SM) which performs the service specific co-ordination function (SSCF) providing adaptation of service information to and from AAL-2. In its simplest form an ED node could be configured using a single SM. Using 0.5 micron VLSI technology an SM that supports several thousand low-bit rate user channels can be integrated into a single component device. To increase the size of an ED node SMs may be cascaded together. To scale the node (and hence network), further ALS Core Modules (ACM) may be added. An ACM performs the minicell switching function, and using current (e.g. 0.5 micron) VLSI technology an ACM that supports tens of thousands on low bit rate channels can be integrated into a single component device. Again, ACMs can be cascaded together in parallel to increase the switching capacity. Using ACMs in an ED node removes the requirement to fully interconnect all SMs to all routes in the network by functioning as AAL-2 tandem switching points.

Also shown in FIG. 6 are physical medium dependent sublayer (PHY) modules that interface the node to the network transport medium (for example SDH or PDH), and optional voice processing modules (VPMs). The VPMs can be used to perform additional voice processing functions for example compression, echo cancellation and silence detection where the interface to the VPMs is via AAL-2 minicells using the appropriate SSCS function of VLSI.

Figure 7:
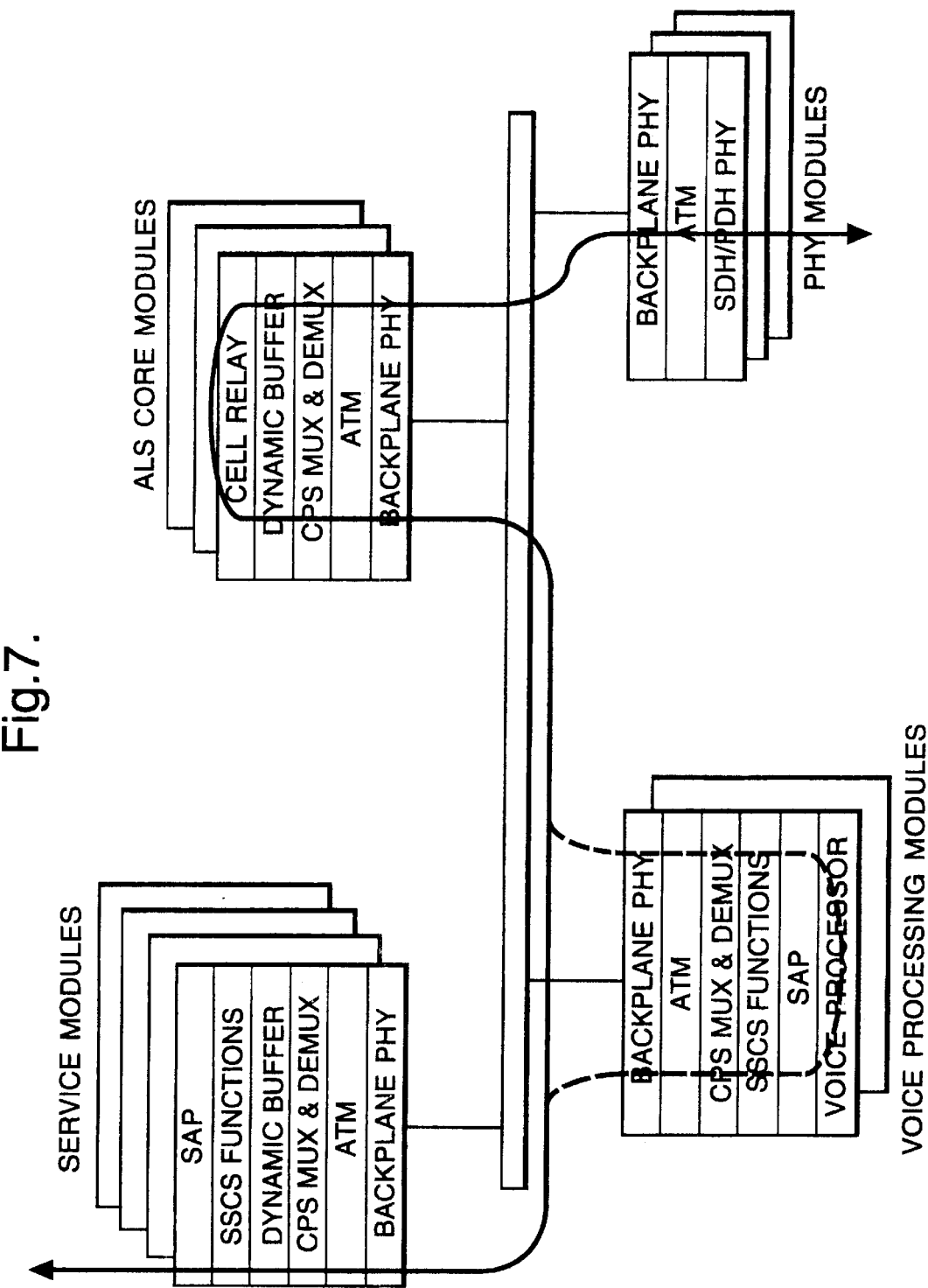
FIG. 7 is a schematic diagram showing a core data path through an edge device of FIG. 6.

FIG. 7 shows the core data path within an ED. User information is (de)adapted into minicells in a service specific manner. The minicells can be optionally routed to a VPM for additional voice processing before being routed to the ACM. The ACM routes the minicell into the network (via a PHY module).

Figure 8:
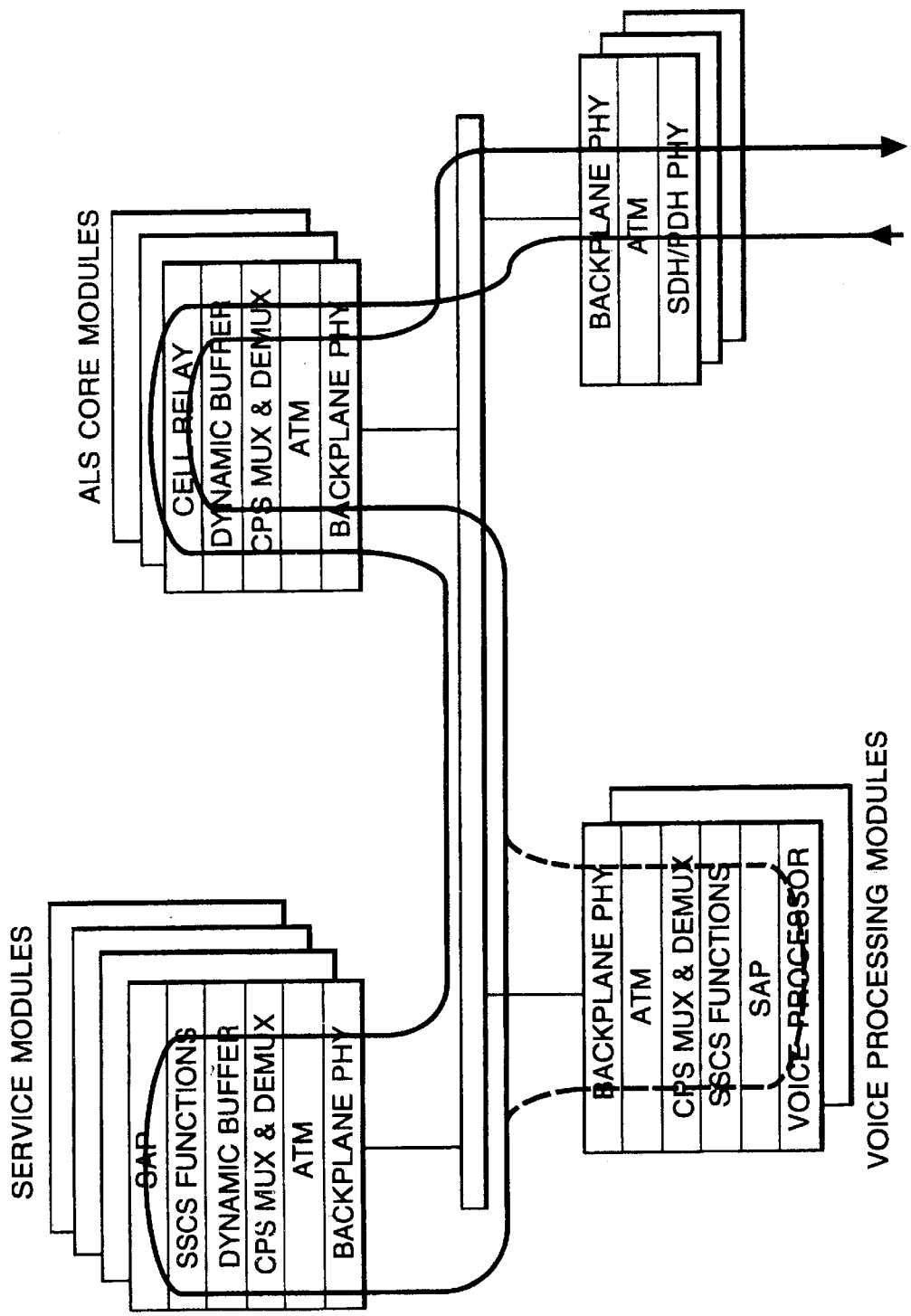
FIG. 8 is a schematic diagram showing an ancillary data path through an edge device of FIG. 6.

The modular partitioning shown however provides the ED node with much flexibility and a number of additional data paths can thus be supported. FIG. 8 illustrates a first ancillary data path in an edge device and shows how the ED can be used to perform a 'grooming' function whereby incoming minicells are routed into an SM where an SSCF conversion is performed (mapping one SSCS to a differing SSCS) before re-routing the resultant minicell back to the network. Again optional additional voice processing functionality can be performed via the VPM.

Figure 9:
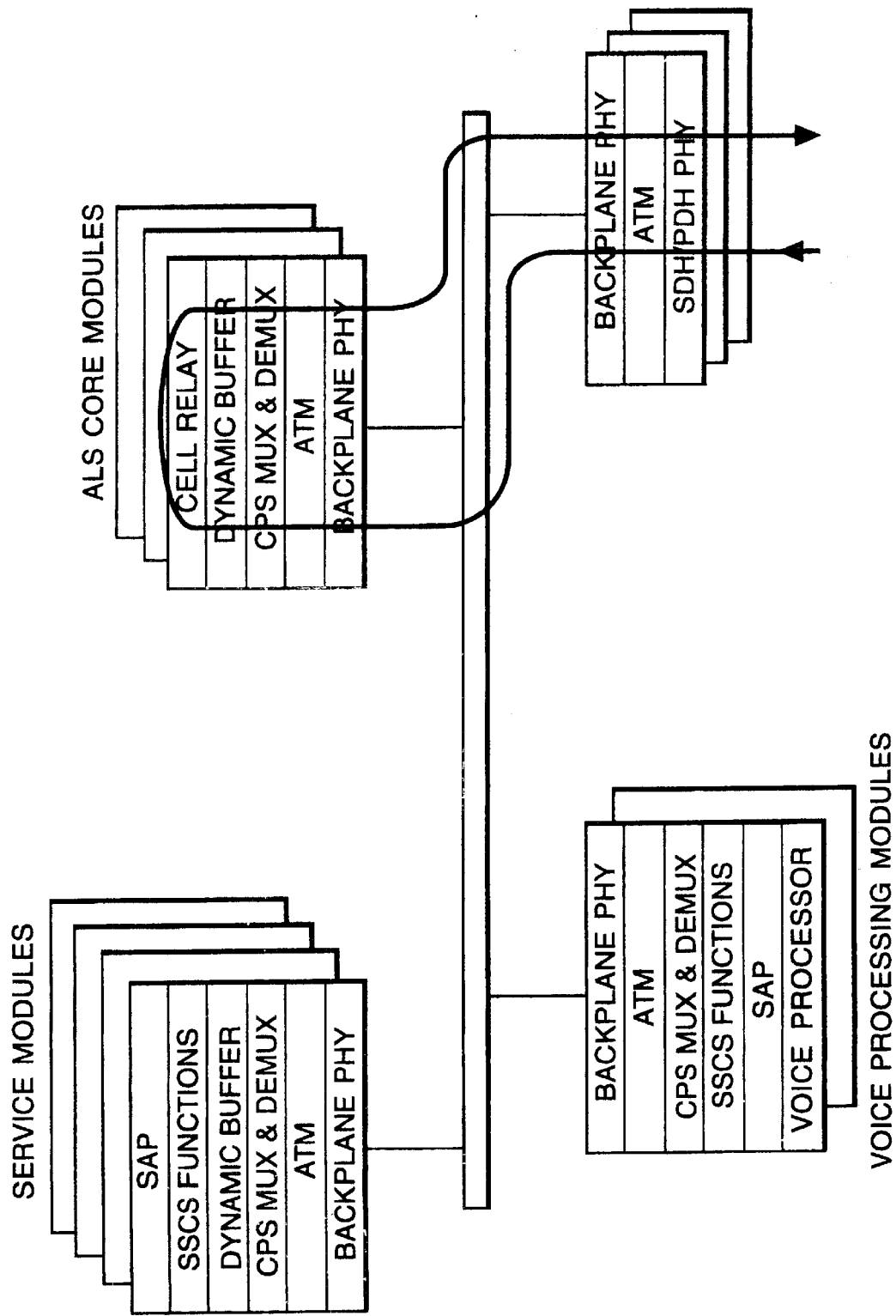
FIG. 9 is a schematic diagram showing an alternative ancillary data path through an edge device.

FIG. 9 illustrates a further ancillary data path in an edge device and shows how the ACMs in an ED can be used to perform a network minicell switching function. In this manner a single physical ED node can perform the logical functionality of both the ED and ALS nodes. This is very useful particularly when configuring smaller network solutions.

Figure 10:
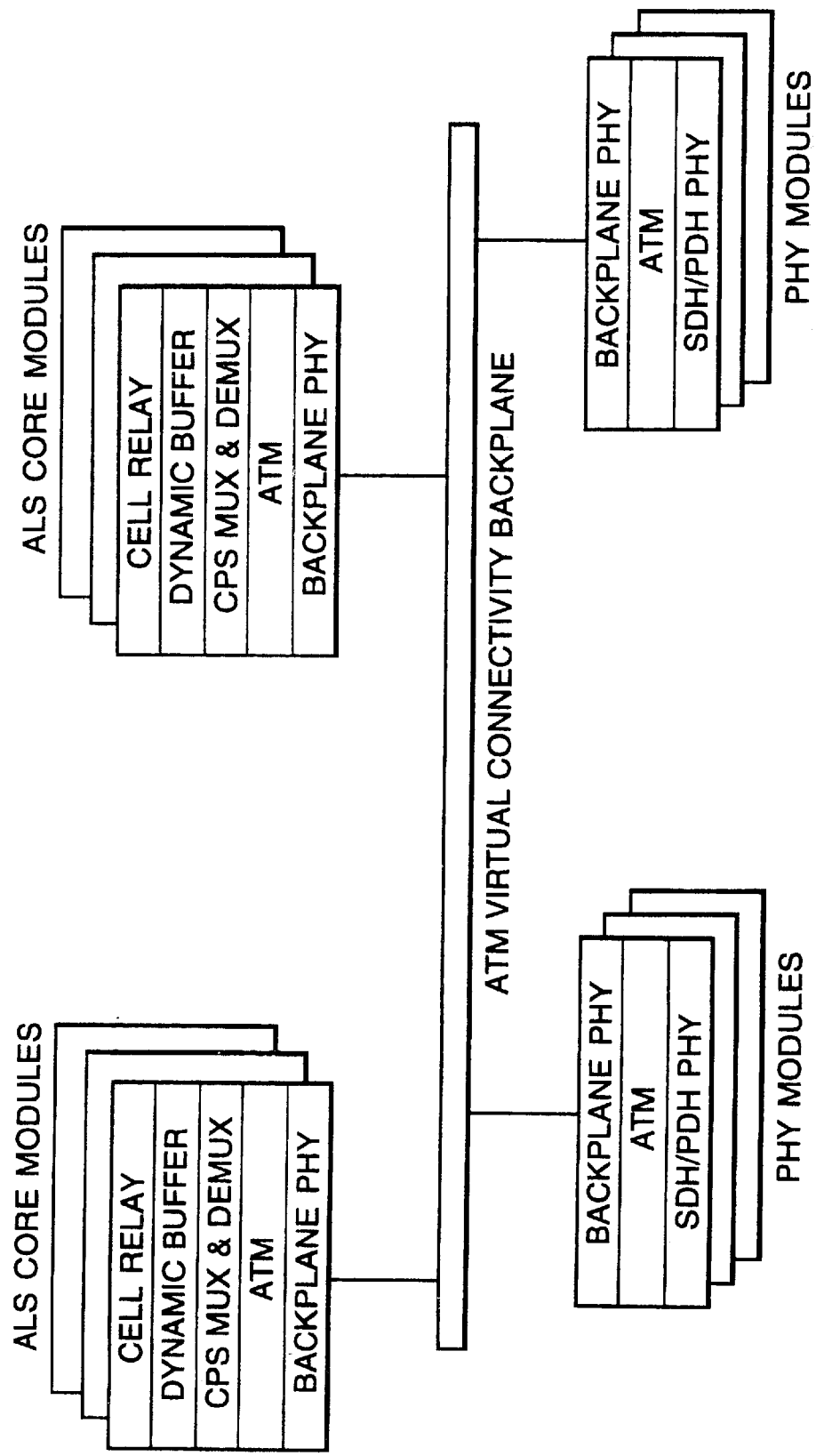
FIG. 10 shows the modular partitioning of an ALS node of the network of FIG. 5.
Figure 11:
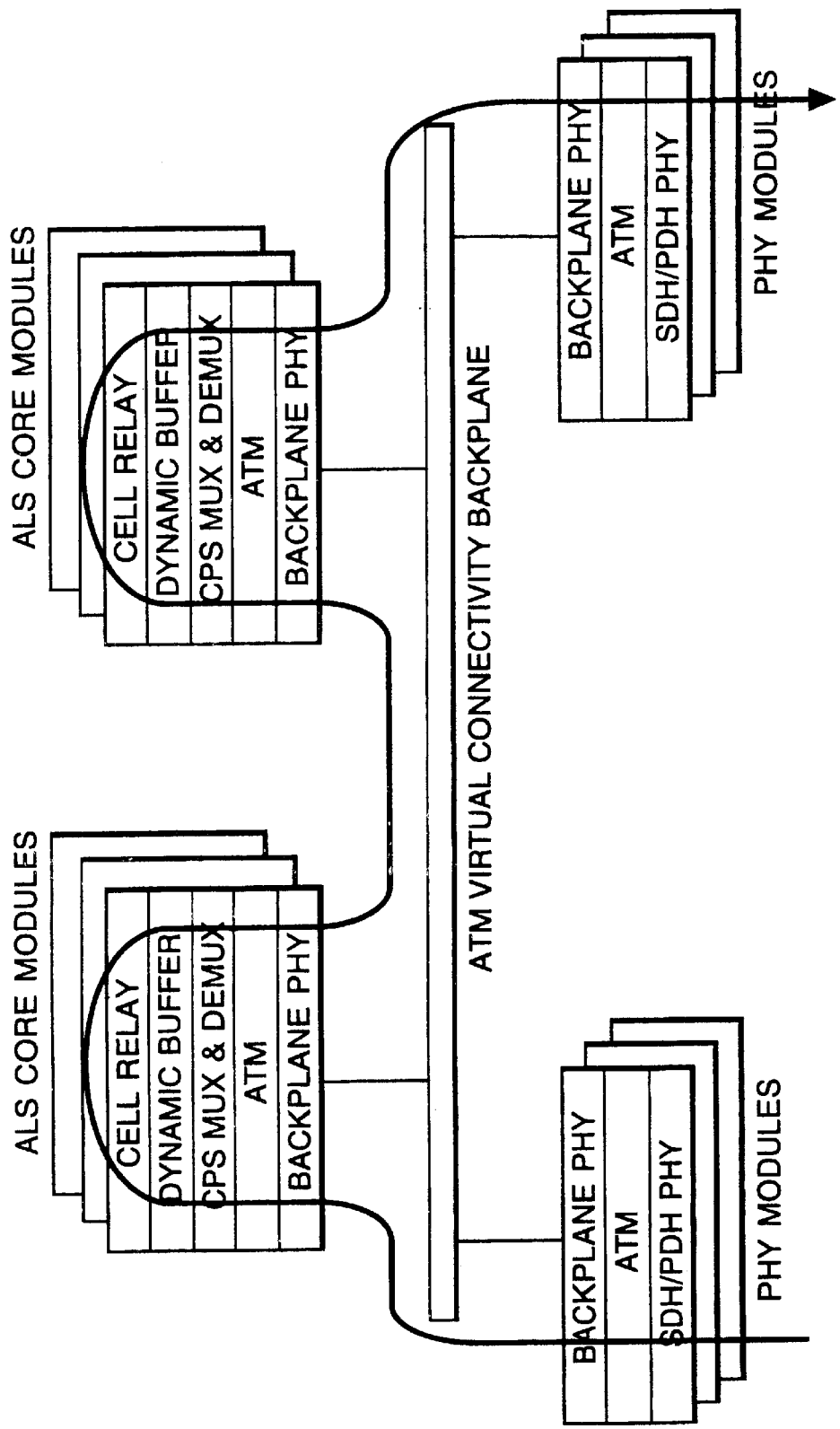
FIG. 11 shows an ALS node data path.

To scale the network further (e.g. up to global proportions) a single stand-alone stage of ALS nodes can be added to the network. The generic modular partitioning of the ALS node is shown in FIG. 10. The node is shown 'unfolded' to illustrate the logical use of a double bank of ACMs (and associated PHY modules). This double switching bank enables very high switching fan out to be achieved—an incoming minicell on one of the VC supported on any one of the ACMs can be switched to any of the other ACMs (in the next bank) where it can be switched onto any one of the network facing VC's that it supports. This is illustrated in FIG. 11 which illustrates an ALS node data path between first and second PHY modules via first and second ALS core modules and the ATM virtual connectivity backplane.

Single Fabric Switch

Figure 12:
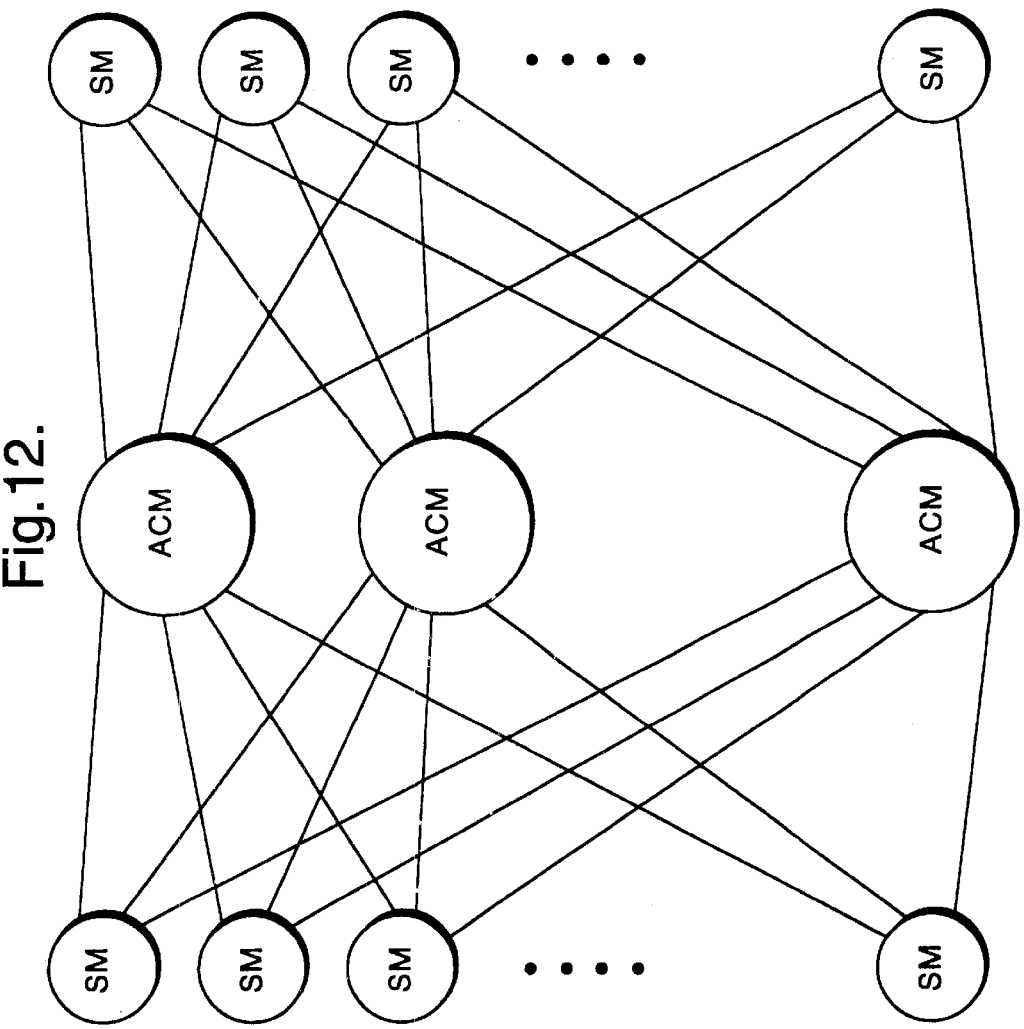
FIG. 12 is a schematic diagram of a stand-alone single node.

The combination of SM and ACMs described above can also be configured to form a stand-alone single node solutions. The nodal configuration is shown in FIG. 12 and consists of a fully interconnected mesh of SM and ACMs. The fully interconnected mesh guarantees that load balancing can be applied across all VC's and thus the node provides strict sense non blocking performance. The configuration described above could be used as a plug-replacement for the connectivity provided by a current generation narrow band (synchronous) switch (and offers equivalent QoS for 64 kb/s). Further such a switch can also support a full mixture of soubrette and full rate services in an efficient manner, and can also support additional semi-synchronous and synchronous services. The inherent scalability of the modular technology enables a node that can support several hundred thousand narrow band connections to be supported.

VLSI Architecture

In this section a generic VLSI solution that delivers the SSCF and minicell switching functions is described.

The VLSI architecture comprises the following principles:

- a Service Access Point (SAP) that is the association between the adaptation layer and synchronous/semi-synchronous/asynchronous delivery of user information,
- a Dynamic Circuit/Packet Switch that performs: a concentration function by dynamically mapping circuits or packets to/from AAL-2 VCs and mini-cell channels; a cross-connection function for exchange between optional voice processing devices; and a multi-casting capability (this is an SSCS function);
- an AAL-2 Segmentation and Reassembly (SAR) function that exchanges circuit/packet based user channels to and from the payload of minicells(this is an SSCS function);
- a dynamic buffer management function that forms a common shared memory architecture to provide: a dynamic amount of buffering per AAL-2 VC and minicell channel; plesiochronous buffer control; cell delay variation compensation; and the adaptation layer space switching matrix (the dynamic buffer is part of the CPS);
- an AAL-2 multiplexing, demultiplexing and switching control function that operates on the dynamic FIFO queues in the buffer (this is an CPS function);
- and an ATM multiplexing, demultiplexing function that interfaces to the network or an ATM backplane and forms the ATM Service Access Point (SAP).

Figure 13:
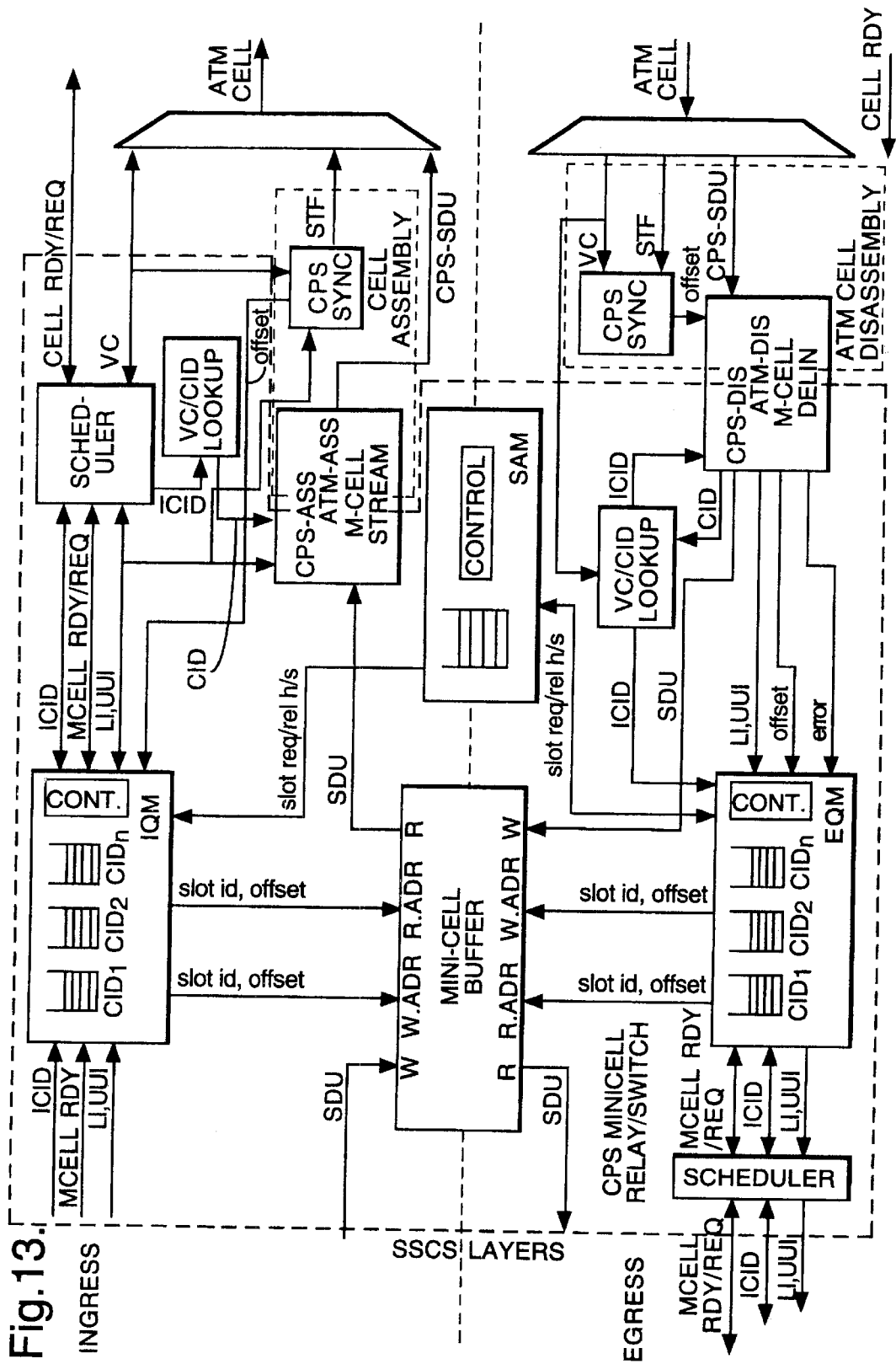
FIG. 13 is a block diagram illustrating the generic partitioning of the VLSI architecture.

FIG. 13 shows a block diagram of the generic partitioning of the VLSI architecture. For clarity, only the core part sub-layer technology is shown in this diagram. The SSCS functionality is service dependent (an example SSCS partitioning for synchronous and semi-synchronous services is described in the following section).

The structure of FIG. 13 is split into three parts—the ingress side (generating ATM cells) the egress side (receiving ATM cells) and a common dynamic buffer and control. The dynamic buffer is used to store the minicells. It is organised as in-directed linked lists of equally sized slots of memory. The difference between the head and the tail of the list is effectively the amount of stored information per minicell channel ID per VCC. This can converted into units of time for synchronous services according to the service type, the packet size and bit-rate represented. A dynamic buffer is required for AAL-2 because, although for a DBR service the Cell Delay Variation (CDV) has a fixed maximum, the number of users per AAL-2 VCC is able to vary dynamically, so the buffer size is required to vary as a function of the number of configured users. For synchronous services a constant mean time difference is maintained between head and tail. For plesiochronous compensation, this is monitored for slowly changing trends and a slip or a stuff function by an amount appropriate to the service is invoked to meet standards requirements. For CDV compensation this is achieved by setting the time difference slightly in excess of the amount of configured CDV, and is monitored frequently. A training algorithm determines the smallest cell transfer delay (minimum CDV or earliest cell) which is unchanging under load. Thus only lost or late minicells need be compensated by detecting the onset of buffer under-flow, and using the previously described stuff mechanism (compensation is an SSCS function).

The minislot dynamic buffer is controlled by the Slot Allocation Module (SAM). This maintains a list of the free slots available in the buffer. New slots are assigned to the ingress and egress and old slots reclaimed through the use of a simple handshake procedure between the SAM and the ingress and egress queue managers respectively.

The operation of the egress and ingress processes are now described in more detail starting with the egress functionality.

ATM cells transporting AAL-2 minicells are received at egress. The ATM demultiplexing function strips the ATM header from the payload. The header HEC information is processed to ensure the header is valid—it is not the whole of the cell is junked. The header VCI/NPI information is processed and the VC identifier passed to the cell payload disassembly process (the architecture is capable of supporting many VC's in parallel). The ATM payload is also forwarded to the cell payload disassembly process.

The first function performed by the payload disassembly process is the CPS synchronisation function (CPS SYNC on the diagram). A key feature of AAL-2 is that minicells are transported asynchronously over the ATM payload so, in general, the start of a cell will contain the remainder of a minicell transported in the previous ATM cell (of that VC stream). The CPS SYNC function must thus ensure that the reassembly of the two minicell parts occurs successfully. Since the length of the minicell is always known (through the LI field of the header), the number of octets expected in the remainder is also known. However, ATM cell loss or error could cause misconnection of minicell parts to occur, so the AAL-2 process includes a start-field (STF) with every ATM cell to prevent this. The one octet STF contains an offset (effectively denoting the length of the minicell remainder in the ATM payload) and a single-bit sequence number to enable detection of lost ATM cells (the STF is error protected via a single bit parity). Thus the function of the CPS SYNC is to process the STF field and in normal operation it will verify that the minicell remainder is the expected remainder (i.e. it verifies that its expectation of the offset is the same as that sent in the STF). If an error is detected then an error status signal is generated, the part minicell stored in the dynamic buffer may be discarded and minicell disassembly begins at the next minicell boundary contained in the ATM cell payload. The error status allows an SSCS layer to mitigate the error in a service profile manner.

The disassembly of the minicells from the ATM cell payload is performed by the minicell delineation function (MCELL-DELIN). This processes the ATM payload, extracting the minicell packet header information and minicell payloads (SDUs).

The MCELL-DELIN performs error detection on the minicell headers—the remainder of the payload may be discarded on detection of an error. The detected minicell CID together with the VC is used to determine a unique identifier for the VC/CID combination (ICID). The ICID is used to store the minicell payload in the appropriate queue in the dynamic buffer (the buffer may maintain a queue for each VC/CID stream or use fewer queues depending on the service relationship between minichannels). The extracted minicell SDUs are written into the minicell buffer under control of the egress queue manager (EQM).

The EQM maintains the minicell queue for each VC/CID stream. New minicells are written to the tail of the queue and old minicells are read into the SSCS functions (or CPS if relay) from the head of the queue. The minicell SDUs are stored in the dynamic buffer. Thus the EQM must maintain a list of slot identifications (or buffer addresses) where the SDUs are located for each VC/ID stream. Additional control information is also stored in this list by the EQM including the length of the minicell SDU (LI), the user-to-user bits (UUI), and any error status. These fields are extracted from the minicell packet headers by the MCELL-DELIN function and passed directly to the EQM.

When a complete minicell packet has been written into the dynamic buffer the EQM signals this to the egress scheduler via the ICID and MCELL R, DY (minicell ready) flags. The egress scheduler can operate in either master or slave modes. In master mode, the egress scheduler schedules the dispatch of minicells into the SSCS functions. This is useful for asynchronous or semi-synchronous services which may perform their own buffering. The order of dispatch can of course differ to the order that minicells are received according to QoS criteria. To dispatch a minicell the scheduler sends a ICID and MCELL-RDY flags to the SSCS functions and simultaneously sends the ICID and a MCELL-REQ (request) to the EQM. The EQM will then control the reading of the minicell SDU from the dynamic buffer (the LI and UUI information is also passed across to the SSCS functions). The minicell is taken from the head of the relevant queue and once read the slot is relinquished back to the SAM. In slave mode, e.g. for synchronous or semi-synchronous services, the egress scheduler acts transparently—forwarding MCELL RDY and MCELL REQ flags between the EQM and the SSCS layers. (In slave mode the receipt of a minicell is indicated to the SSCS layer and the SSCS layers determine when to request this minicell— this enables the dynamic buffer to be used by the SSCS layers for compensation of CDV, jitter and plesiochronous behaviour when supporting synchronous or semi-synchronous services.

The ingress process shares much commonality with the egress process. It accepts minicell packets from the SSCS layers and assembles them into ATM cells for transport across the ATM network.

Again the dynamic buffer is used to store the minicells prior to dispatch. The SSCS signals the availability of minicell data to the ingress process via the ICID and MCELL RDY flags. The minicell SDU is written into the dynamic buffer under the control of the ingress queue manager (IQM). The IQM operates in a manner entirely analogous to the EQM.

The availability of a minicell is signalled to the ingress scheduler by the IQM. The egress scheduler resides in the ATM cell assembly block. Again the scheduler can operate in both slave and master mode. In slave mode the assembly of minicells is slaved to the ATM layer. Thus the ATM layer will request an ATM PDU for a particular VC and the scheduler will begin its assembly immediately. This mode is particularly useful if the VC connections are true CBR connections—thus ATM cells for a particular VC are dispatched at regular intervals irrespective of the minicell loading of that VC. In master mode the scheduler dictates the dispatch of ATM cells according to a pre-defined scheduling algorithm (according to QoS criteria). The scheduling algorithm will be designed to provide a desired per VC QoS. In general the scheduler will maintain timers per VC to ensure that the AAL-2 holdover delay parameter is met. Whether in slave or master mode the scheduler has the capability to instigate a padding function to allow the dispatch of partly filled ATM cells.

Under control of the ingress scheduler minicell SDUs are read from the dynamic buffer. Since the IQM maintains a per VC per CID linked list of available minicells with this architecture it is a simple manner to have many differing levels of minicell priority multiplexed into a single VC. The ATM payload is assembled in the cell assembly block which again shares much commonality with the cell disassembly block. In particular both a VC/CID lookup function is performed (to translate the ICID to the minicell CID) and a CPS-SYNC function that synchronises the segmentation of a minicell over successive ATM payloads. The assembly of the minicell packets and ATM payload is performed in the MCELL-STREAM function that performs the inverse of the MCELL-DELIN function found in the egress. The MCELL-STREAM generates the minicell packet headers from the CID, LI and UUI information (including EDC information), and multiplexes this with the SDU data to form the minicell stream which together with the STF field formed by the CPS-SYNC function forms the payload of the ATM cell.

The ATM payload together with the VO information is used to generate a complete ATM cell by the ATM cell multiplexing function.

In FIG. 13, the ingress and egress functions have been separated and shown independently. Further the a partitioning between the ATM cell assembly/disassembly and the CPS minicell relay/switch function is shown. Those skilled in the art will recognise that the ATM cell assembly/disassembly blocks could be replaced with blocks defined to support any other transport structure (for example MPEG-TS frames)—the minicell switch/relay block remains identical. Further the ingress and egress parts of the minicell switch/relay function can also be made into a single silicon macro sharing common blocks serving both flow directions.

Minicell Switching

Figure 14:
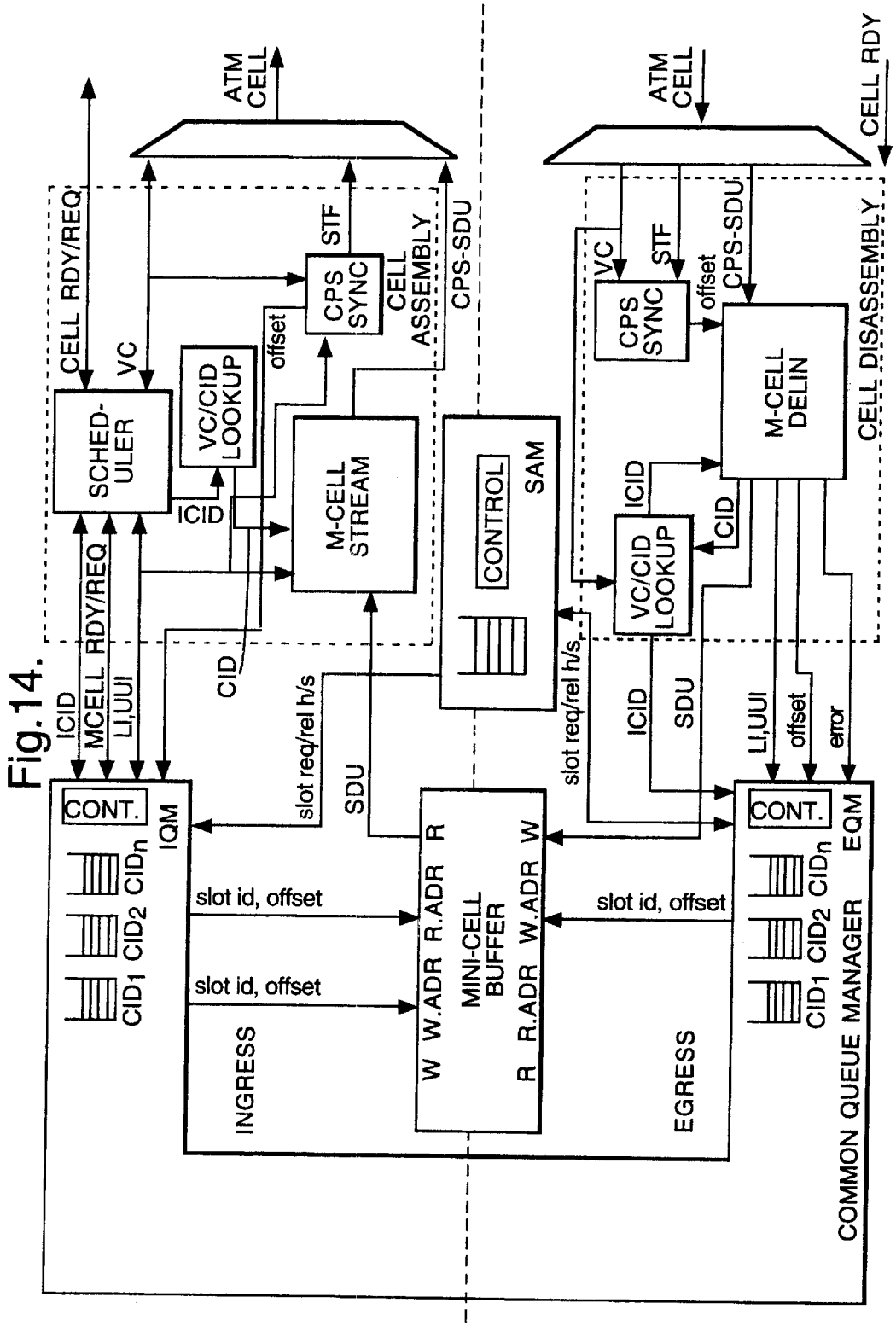
FIG. 14 FIG. 14 which illustrates VLSI partitioning and minicell switching.

The description above described the action of the CPS layers when implementing the SSCF function. However the technology is equally applicable to performing the minicell relay or switching function. When performing the minicell switching function the minicells received at egress immediately form the minicells being queued at ingress—effectively the IQM and EQM functions are collapsed into a single function by tying the ingress egress and ingress scheduler together. This is illustrated conceptually in FIG. 14 which illustrates VLSI partitioning. The minicell switch does not therefore need to maintain a separate ingress and egress queue when performing the minicell switching function.

Figure 15:
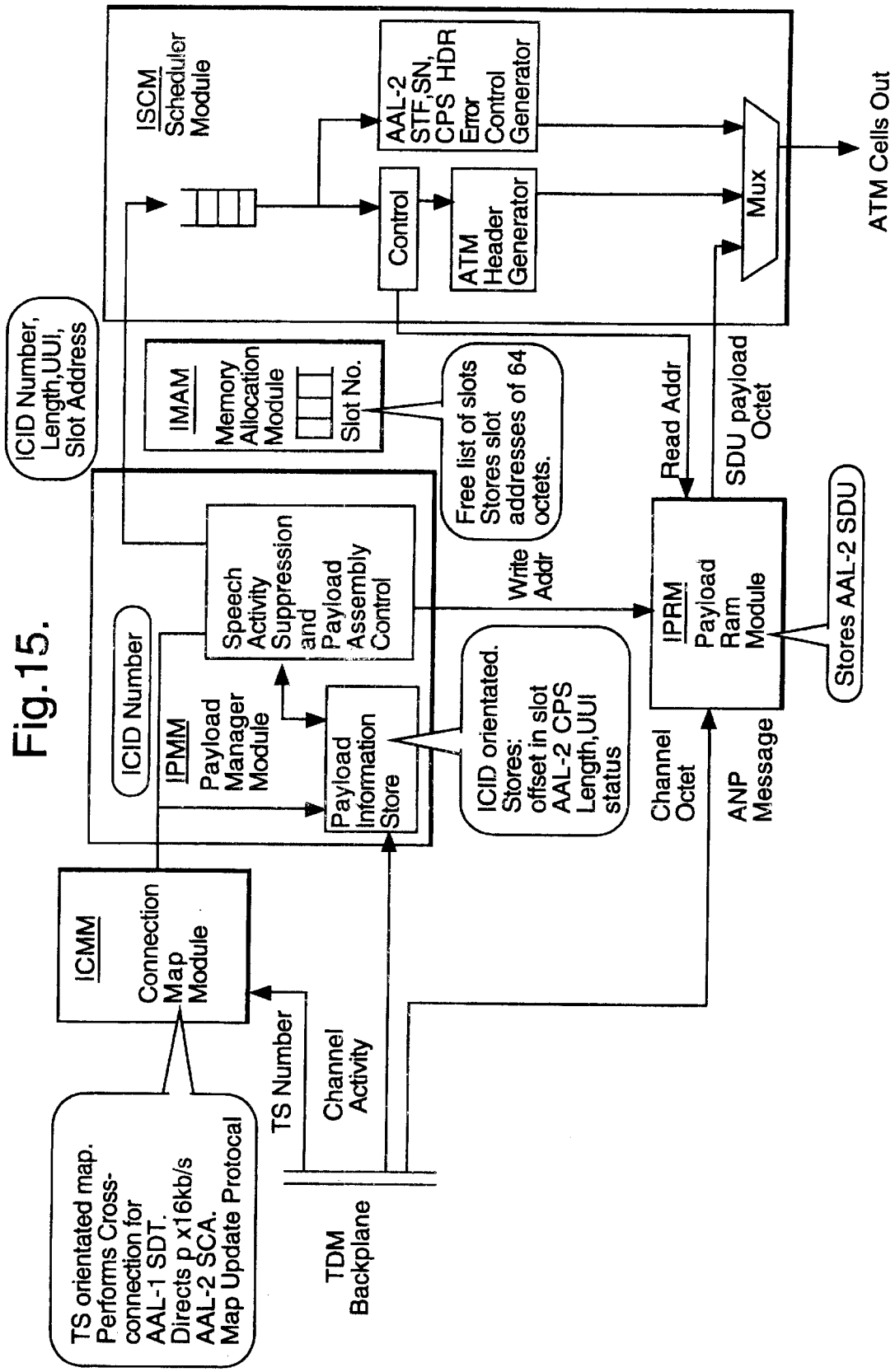
FIG. 15 illustrates partitioning for synchronous and semi-synchronous ingress service specific co-ordination functions (SSCF)
Figure 16:
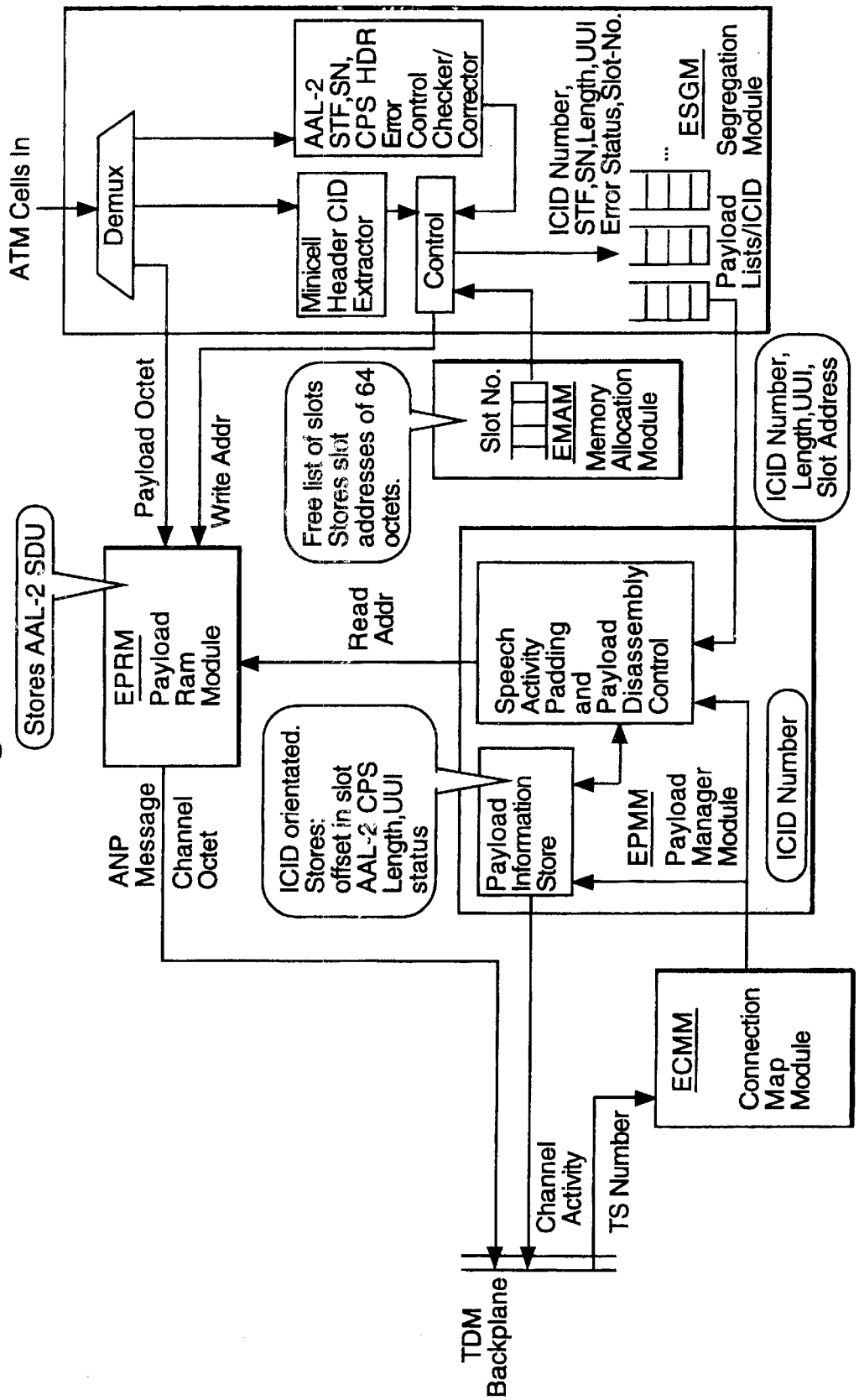
FIG. 16 illustrates partitioning for synchronous and semi-synchronous egress service specific co-ordination functions (SSCF)

The previous section described a general embodiment of the CPS partitioning suitable for supporting all service types. In this section we describe by way of example a specific embodiment of a VLSI chip to perform the service convergence function for synchronous and semi-synchronous sub-rate services. In particular (although not restricted to) the invention is designed to support ADPCM (at rates down-to 16 kb/s) with or without speech-activity-detection (SAD) according to ITU G.726. The ingress and egress functionality of the VLSI ASIC is shown in FIGS. 15 and 16 which illustrate partitioning for synchronous and semi-synchronous SSCF.

The ingress function is first described. Incoming service data is written into the ASIC in a synchronous manner and assembled into minicell packets under control of a connection map module (ICMM) mapping time slots to ICID. The synchronous user data is written into the payload of the relevant minicell packet. This process is controlled by the payload manager module (IPMM) which controls the minicell payload assembly process and performs additional functions including SAD. SAD is driven by the channel activity signal which signifies the silence/speech status. Minicells SDU are assembled in the payload RAM module (IPRM). This is a dynamic memory and a control module (IMAM) controls the allocation and de-allocation of slots, large enough for the largest minicell, in this memory.

Completed minicells are assembled into ATM cells under action of the scheduler module (ISCM). This block performs scheduling, CPS assembly, STF assembly, minicells multiplexing and the ATM cell header generation functions.

On egress ATM cells are demultiplexed in the egress scheduler module (ESGM). This controls the disassembly of minicells. Minicell SDUs are written into the payload RAM module (EPRM). The scheduler maintains a per CID linked list queue. The ESGM also performs the functions of STF verification and minicell header extraction.

Again the EPRM is a dynamic buffer and the allocation/reallocation of slots in this memory is controlled by the egress memory allocation module (EMAM). The dynamic buffer is used to store the received minicells—to absorb jitter, CDV and plesiochronous behaviour an elastic buffering function is performed per ICID under control of the EPMM.

The egress payload manager module (EPMM) controls the disassembly of the minicell SDUs to the synchronous time slots. A connection map (ECMM) identifies the minicell to time slot associations. The ECMM also performs ancillary functions such as SAD detection. If no minicells are available, or UUI bits indicate a silence period, then the channel activity signal is not asserted. ANP messages may readily use this channel activity to interface to a microprocessor such that available data may be read/written to a SDU and scheduled for despatch or consumed by the microprocessor.

Figure 17:
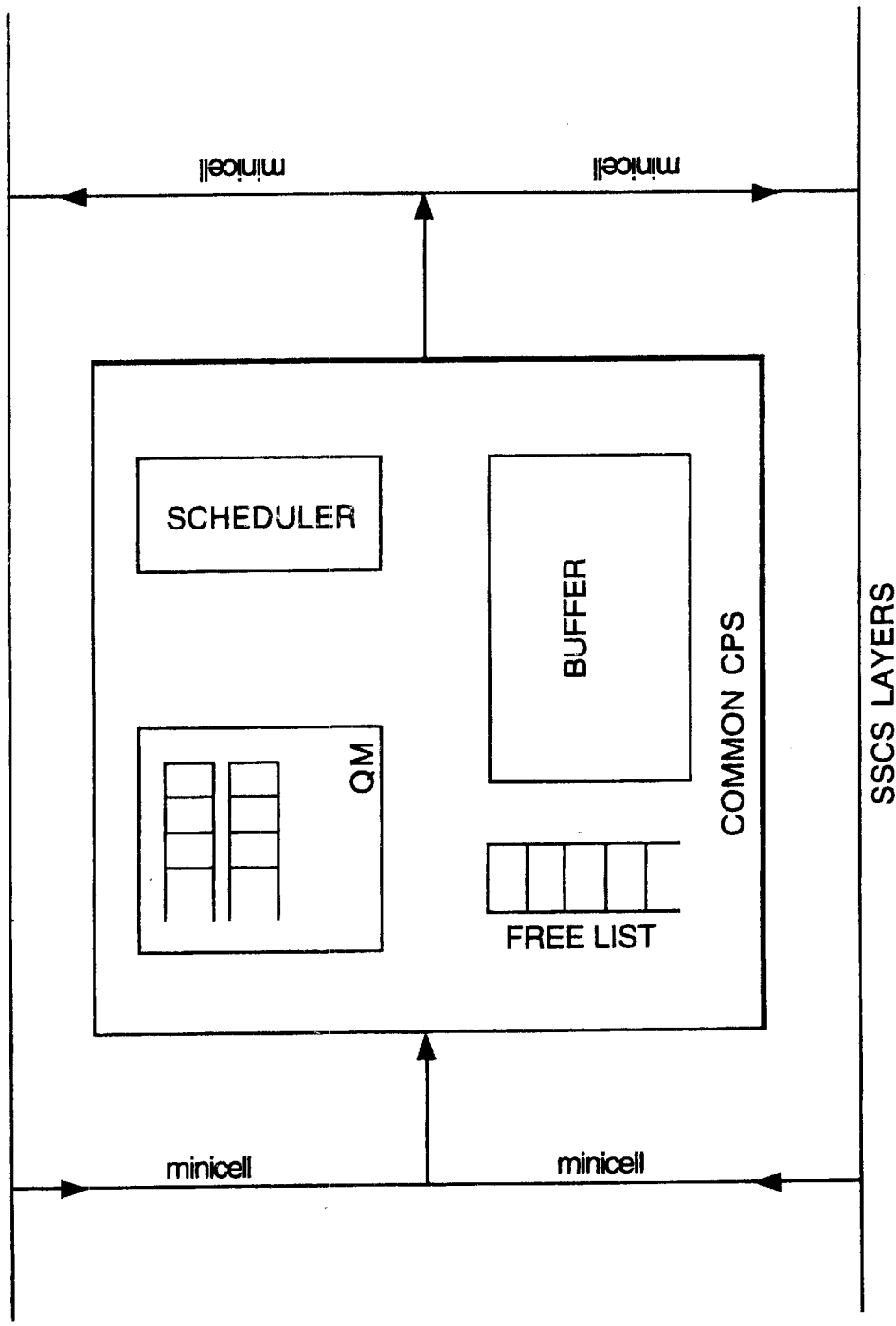
FIG. 17 shows a common integrated common part sublayer (CPS).

FIG. 17 shows in block schematic form a common integrated CPS. Input to the CPS comprises minicells from either ATM or SSCS layers. The output also comprises minicells which are routed to the SSCS or ATM layers accordingly. Incoming minicells are written to the tail of the queue and outgoing minicells are read from the head of the queue. The scheduler controls these processes.

The functional partitioning described above achieves the separation of the functions of CPS packet assembly, switching and the convergence of the minicells stream onto the underlying transport structure. Thus those skilled in the art will recognise that the ATM layer can be replaced by any other regular transport layer (for example MPEG-TS frames). Thus using identical CPS assembly/switching functions one can adapt the invention to operate over any regular transport structure—the use of minicells is therefore not restricted to ATM.

It will be understood that the above description of a preferred embodiment is given by way of example only and that various modifications may be made by those skilled in the art without departing from the spirit and scope of the invention.

What is claimed is:

1. An adaptation layer switching network for transporting traffic carried in asynchronous minicells mapped into asynchronous transfer mode (ATM) cells, said switching network comprising a plurality of edge device nodes (ED) interconnected by a multiplicity of ATM links via a number of adaptation layer switches, wherein each adaptation layer switch has:

means for receiving/transmitting ATM cells over a number of the plurality of ATM links interconnecting said EDs;

means for switching ATM minicells between switch ingress points and egress points; and means for assembling switched ATM minicells into ATM cells for transmission on one or more of said plurality of ATM links interconnecting the EDs;

and wherein each ED has an adaptation layer (AAL) thereof arranged as:

a service specific convergence sublayer (SSCS) for assembly/disassembly of ATM minicells in a service specific manner; and a common part convergence sublayer (CPS) for assembly and disassembly of ATM minicells to/from ATM cells.

2. An adaptation layer switching network as claimed in claim 1, wherein the edge device nodes terminate the adaptation layer switching nodes to service points, and the adaptation layer switches provide minicell switching points within the network.

3. An adaptation layer switching network as claimed in claim 2, characterised in that each said edge device node comprises service modules (SM), adaptation layer switching (ALS) core modules, voice processing modules, and physical medium dependent sublayer (PHY) modules, said modules being coupled via an ATM virtual connectivity back plane.

4. An adaptation layer switching network as claimed in claim 3, characterised in that each said service module is adapted to provide a service specific convergence function (SSCF) of adaptation of service information.

5. An adaptation layer switching network as claimed in claim 4, characterised in that said physical medium dependent sublayer (PHY) modules are each adapted to interface the edge device node to a synchronous or plesiochronous transport medium.

6. A method of transporting traffic of different service types over an adaptation layer switching network, comprising the steps of:

at an edge device node (ED), mapping traffic data into ATM minicells in a service specific manner;

mapping ATM minicells into ATM cells;

communicating said ATM cells over one of a plurality of ATM links interconnecting said ED with a plurality of other such nodes via a number of adaptation layer switches; and at an adaptation layer switch, receiving said ATM cells, disassembling said ATM cells into ATM minicells; and switching said ATM minicells to a number of egress points of the adaptation layer switch where, said minicells are assembled into ATM cells for onward transmission over a number of said ATM links to respective other EDs.

7. An adaption layer switch for switching traffic carried in asynchronous minicells mapped into asynchronous transfer mode (ATM) cells, the switch being functionally arranged to have:

a service specific convergnce sublayer (SSCS);

a common part convergence sublayer (CPS) functionally partioned from said SCCS, said CPS including an ATM sublayer for handling the reception/transmission of ATM cells, a CPS de-multiplexer sublayer for disassembling ATM minicells from received ATM cells, a CPS relay sublayer for switching minicells from ingress to egress functions and a CPS multiplexer sublayer for assembling switched minicells into ATM cells for onward transmission from the switch.

8. An edge device node (ED) for an adaption layer switching network for transporting traffic carried in asynchronous minicells mapped into asynchronous transfer mode (ATM) cells, said ED comprising a service specific convergence sublayer (SSCS) having means for assembling traffic data into ATM minicells in a service specific manner; means for assembling ATM minicells into ATM cells for transmission over an ATM link, and means for determining which one of a plurality of ATM links of a plurality of links connecting said ED to other EDs that an ATM cell or series of cells should be transmitted upon.

* * * * *